United States Patent [19]

Suttles

[11] 4,319,793

[45] Mar. 16, 1982

[54] SHEET METAL CABINET

[75] Inventor: J. Marshall Suttles, Elberton, Ga.

[73] Assignee: Royston Manufacturing Corporation, Royston, Ga.

[21] Appl. No.: 167,928

[22] Filed: Jul. 14, 1980

Related U.S. Application Data

[62] Division of Ser. No. 52,114, Jun. 26, 1979.

[51] Int. Cl.³ ................. A47B 43/00; A47B 87/00
[52] U.S. Cl. ........................ 312/257 R; 312/108; 312/257 SM; 312/263
[58] Field of Search ..... 312/257 R, 257 SK, 257 SM, 312/263, 264, 250, 256, 108

[56] References Cited

U.S. PATENT DOCUMENTS

| | | | |
|---|---|---|---|
| 1,729,475 | 9/1929 | Brainard et al. | 312/257 SK |
| 2,194,421 | 3/1940 | De Saussure, Jr. | 52/826 |
| 2,710,785 | 6/1955 | Morin | 312/257 R |
| 2,956,688 | 10/1960 | Galassi . | |
| 2,992,055 | 7/1961 | Kass | 312/108 |
| 3,085,693 | 4/1963 | Shell . | |
| 3,130,693 | 4/1964 | Shell . | |
| 3,204,545 | 9/1965 | Benson | 312/39 |
| 3,263,821 | 8/1966 | Klene et al. . | |
| 3,556,023 | 1/1971 | Marschak . | |
| 3,601,256 | 8/1971 | Bowers, Jr. et al. . | |
| 3,623,784 | 11/1971 | Neufeld | 312/257 SM |
| 3,966,285 | 6/1976 | Porch et al. | 312/257 R |
| 4,040,694 | 8/1977 | Lascarrou | 312/263 |
| 4,077,686 | 3/1978 | Bukaitz | 312/257 SM |
| 4,090,755 | 5/1978 | Johnson | 312/257 R |

FOREIGN PATENT DOCUMENTS

| | | | |
|---|---|---|---|
| 2382215 | 3/1977 | France | 312/257 SM |
| 960362 | 6/1959 | United Kingdom | 312/257 SM |

OTHER PUBLICATIONS

Typical Core Back as used by Universal Nolan, 6-1979, by J. M. Suttles, 1 sheet.

Primary Examiner—Victor N. Sakran
Attorney, Agent, or Firm—Howson and Howson

[57] ABSTRACT

The vertical walls of a sheet metal cabinet comprise front and back members each having a generally U-shaped horizontal cross-section and side members connected between the U-shaped front and back members. The wall members are connected by interengaging slots and tabs on inwardly extending abutting flanges. One flange of each pair of abutting flanges is provided with a series of slots which serve to support shelves within the cabinet. Gussets located at the corners of the cabinet serve to secure legs to the cabinet and also to prevent disengagement of the wall members by locking the wall members against relative vertical movement. A counter top is secured to inwardly extending flanges at the upper edges of the cabinet walls by clamps which bear downwardly on upwardly facing surfaces secured to and spaced below the counter top. The clamps are secured to the flanges of the wall by screws the shanks of which press upwardly against the underside of the top.

13 Claims, 14 Drawing Figures

SHEET METAL CABINET

CROSS-REFERENCE TO RELATED APPLICATION

This is a division of my copending application, Ser. No. 06/052,114, filed June 26, 1979.

BRIEF SUMMARY OF THE INVENTION

This invention relates to sheet metal furniture, and particularly to cabinets and counters or combinations thereof adapted for use at the check-out location of a convenience store. A typical combination cabinet and counter designed for use in a convenience store comprises a storage cabinet having four generally rectangular vertical walls with a counter top secured to the upper edges of the cabinet walls. One of the vertical walls is typically provided with doors for access to the interior of the cabinet, and a series of removable shelves is provided within the cabinet for the storage of merchandise or other articles. In order to facilitate cleaning of the floor of the store, the cabinet is desirably provided with legs arranged so that the bottom of the cabinet is located some distance above the floor.

Among the general requirements for sheet metal cabinets adapted for convenience store use are ease of assembly and the ability to withstand abuse. In the case of cabinets which are shipped by the manufacturer in a fully assembled condition, ease of assembly is important in order to keep manufacturing costs low. In the case of cabinets which are shipped in a knocked-down condition and assembled on site by the customer, ease of assembly is important because assembly is frequently carried out by untrained personnel. Cabinets used in convenience stores, and especially cabinets having counter tops are subject to abuse both by customers and store personnel. The counter tops in particular are subject to varying loads, pounding, etc., all of which tend to loosen the connection between the counter and its supports.

It is a general object of the invention to provide an article of furniture meeting the above requirements more inexpensively and more satisfactorily than similar articles available heretofore.

Specific problems arise in securing counter tops to storage cabinets or other sheet metal supports aside from the problem of loosening of the interconnections from abuse. For example, the possibility of bending of metal parts under heavy loads has in the past required special strength. It is frequently desirable to provide a counter top which overhangs one or more of the walls of the cabinet, and the overhang presents special problems in securing the top adequately to its support. Therefore, it is also an object of the invention to provide simple but effective means for firmly securing a counter top to its support, which resists the loosening of the interconnection of the top resultant from abuse, which does not require expensive modifications in the construction of the counter top itself, and which allows for an overhanging counter top.

Problems also arise in the design of the cabinet structure. Strength requirements and the need to support removable shelves have in the past necessitated the use of excessively heavy parts and reinforcements, and have generally resulted in excessively complex and expensive structures. Therefore, another object of the invention is to provide a sheet metal cabinet which is strong and durable, yet relatively light in weight, simple, inexpensive and easy to assemble.

The problems relating to the securing of the counter top to its support are solved in accordance with the invention by the use of a novel clamping arrangement in which the counter top is held down by one or more clamping elements secured to flanges on the supports by upwardly extending screws, and in which the upper ends of the screws bear against the underside of the top. Since downward forces acting on the counter top are transferred to the support elements through the screws, the connections between the counter top and the support are unlikely to loosen by reason of varying loads or pounding on the counter top. As the screws form the principal bearing surfaces for the counter top, the top can overhang one or more of the walls of a cabinet on which it is supported while being securely held to the cabinet. The screws hold the clamping elements tightly against the support flanges and at the same time press upwardly against the underside of the counter top. The fact that the screws press upwardly against the top makes it practically impossible for the screws to loosen as a result of vibration of the top.

The problems relating to the cabinet design are solved in accordance with the invention by forming the walls from a U-shaped front member having two integral rearwardly extending side elements, a U-shaped back member having two integral forwardly extending side elements and side members connected between the side elements of the front and back members. The interconnections are made by interengaging slots and tabs on inwardly extending abutting flanges. One flange of each pair of abutting flanges is provided with a series of slots for supporting shelves, thereby eliminating the need for separate shelf-supporting elements. Gussets located at the corners of the cabinet serve to secure legs to the cabinet and also to prevent disengagement of the wall members by locking the wall members against relative vertical movement. The gussets further serve as reinforcements for the corners of the cabinet.

It is also an object of the invention to provide a cabinet which can be shipped, in a knocked-down condition, in a package of relatively small size.

Still another object of the invention is to facilitate fast delivery of cabinets of various types and sizes to customers by the standardization of cabinet components.

Various objects and advantages of the invention other than those discussed above will be apparent from the following detailed description when read in conjunction with the drawings.

DETAILED DESCRIPTION

Figure 1:
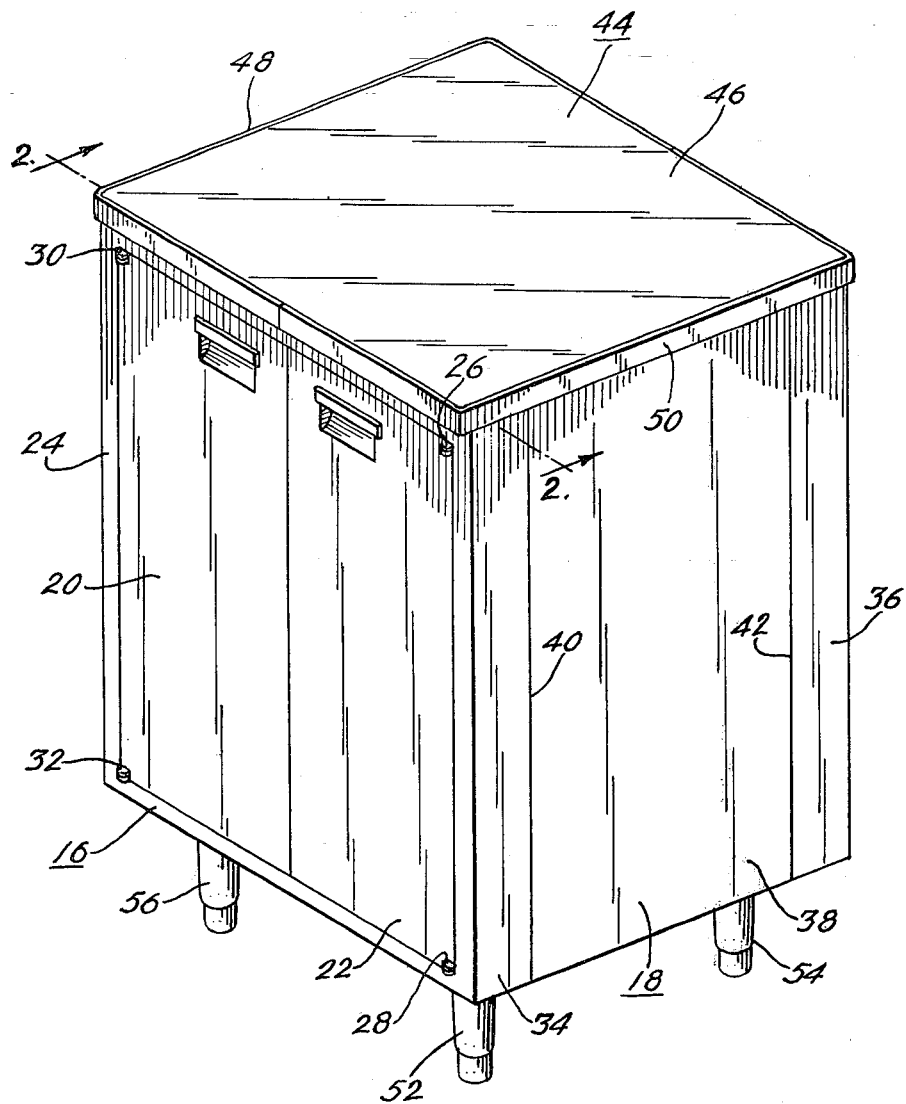
FIG. 1 is an oblique perspective view of an article of furniture in accordance with the invention comprising a sheet metal cabinet with a counter top supported on it.

In FIG. 1, the front wall 16, and a side wall 18 of the cabinet are seen. The front wall comprises a pair of doors 20 and 22 mounted in a frame 24 on hinges 26, 28, 30 and 32. Side wall 18 comprises elements 34, 36 and 38. Element 34 is integral with the frame of the front wall, and extends rearwardly from the front wall through a distance which is typically about nine centimeters. Element 36 is integral with the rear wall (not shown in FIG. 1), and extends forwardly in the plane of side wall 18 through a similar distance. Element 38 of the side wall meets elements 34 and 36 respectively at vertical lines 40 and 42.

The cabinet is provided with a top 44, which is secured to the upper edges of the cabinet walls. Top 44 comprises a rectangular, vinyl-covered particle board 46, which is provided with a metallic trim along its edges. The trim is made of extruded aluminum, and comprises two similar U-shaped trim elements 48 and 50. The ends of the trim elements meet along the front and rear edges of the top in the version of the top shown in FIG. 1. However, in an alternative arrangement, the ends of the trim elements can meet each other along the sides of the top.

The cabinet of FIG. 1 is also provided with legs, three of which are indicated at 52, 54 and 56. A fourth leg of the cabinet is not shown in FIG. 1.

Figure 3:
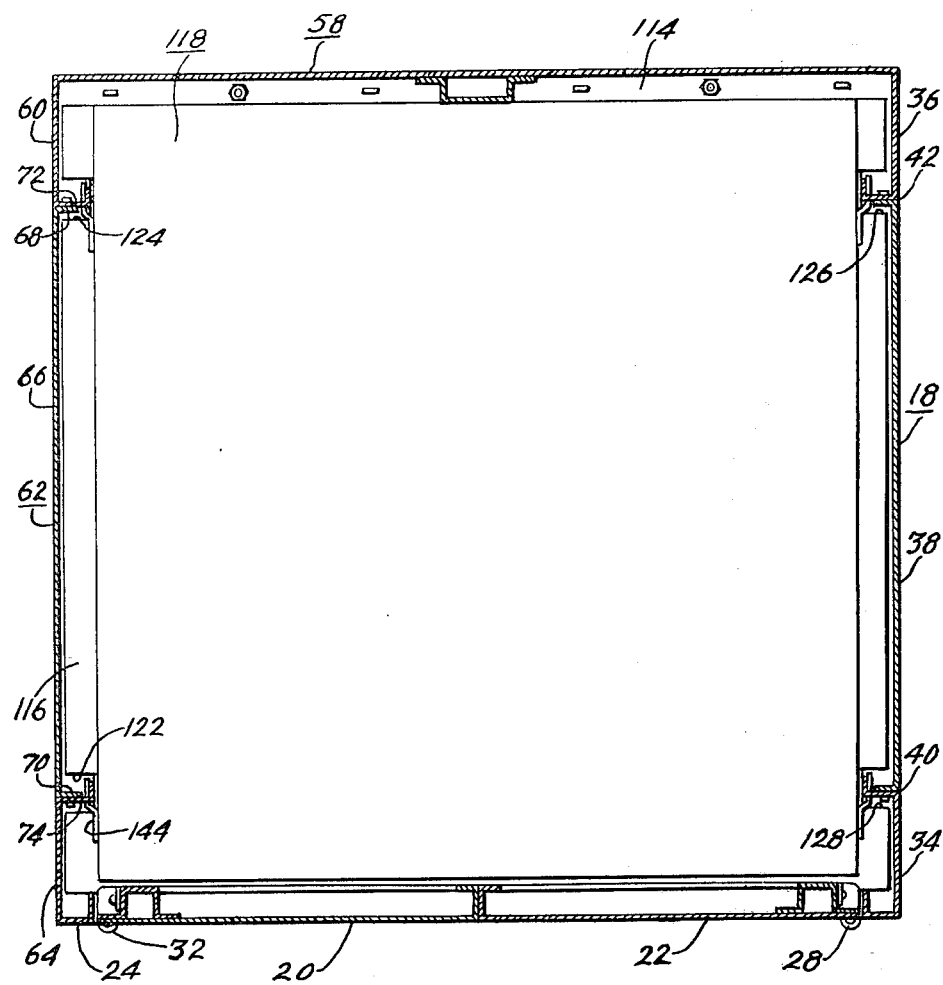
FIG. 3 is a horizontal section of the cabinet taken on the plane 3—3 of FIG. 2.

The arrangement of wall elements and their interconnections is shown in FIG. 3. At the rear of the cabinet, opposite the doors, a rear wall 58 is provided. A forwardly extending element 60, similar to element 36, and integral with rear wall 58 forms a part of the left side wall 62. The left side wall also comprises a rearwardly extending element 64, which is integral with front wall frame 24, and a side wall element 66, which meets side wall elements 60 and 64 so that left-hand side wall 62 is similar to right-hand side wall 18.

Figure 5:
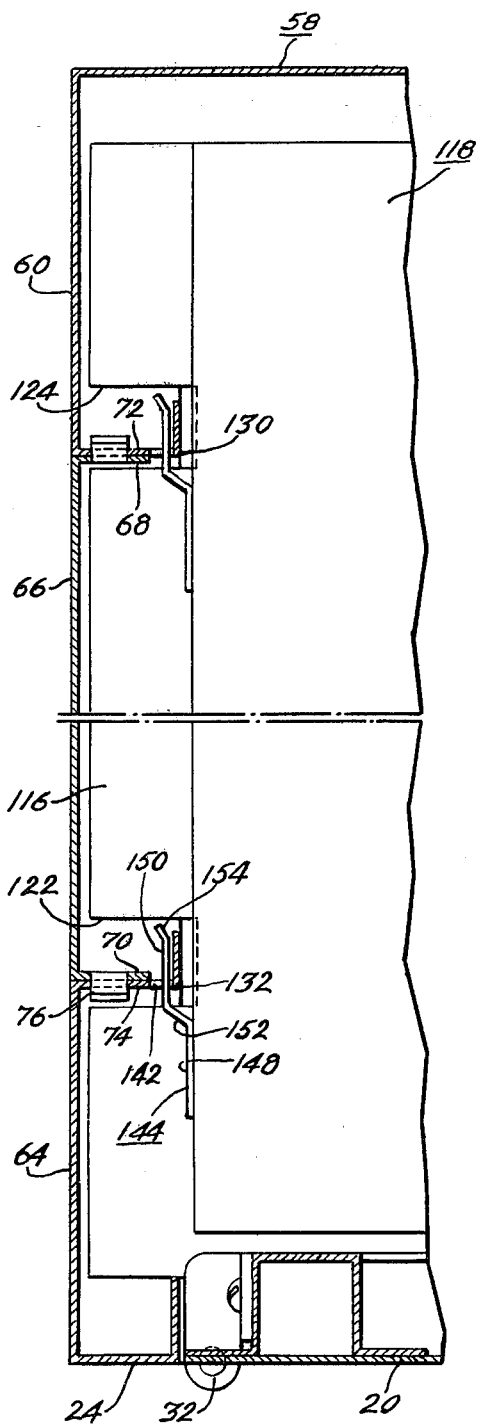
FIG. 5 is a fragmentary horizontal section taken on the surface 5—5 of FIG. 2, illustrating the details of the interconnections between cabinet wall members and also illustrating the manner in which a removable shelf is supported in the cabinet.

As shown in FIG. 5, side wall element 66 is provided with flanges 68 and 70, which extend inwardly from its opposite vertical edges in a direction perpendicular to the plane of the side wall. Flange 68 is in abutment with a flange 72, which is integral with and extends inwardly from side wall element 60. Likewise, flange 70 is in abutment with inwardly extending flange 74 of side wall element 64.

Figure 8:
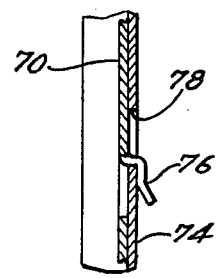
FIG. 8 is a vertical section taken on the plane 8—8 of FIG. 2, illustrating the interconnection between cabinet wall members.

The abutting flanges are connected to each other by a series of interengaging slots and tabs, the tabs being struck out from flanges 68 and 70 of side wall element 66, and the slots being provided in flanges 72 and 74. One such interconnection is illustrated in FIG. 8, in which struck out tab 76 of flange 70 is shown extending through slot 78 of flange 74, and downwardly along the opposite side of flange 74 so that the elements are held together. The height of slot 78 is just slightly greater than the height of tab 76, so that engagement of the abutting flanges 70 and 74 can be achieved readily by moving them together horizontally so that the tabs enter the slots, and then locking the flanges together by relative vertical movement so that the tabs and slots are engaged as shown in FIG. 8. It should be noted at this point that the struck out tabs could be provided on flanges 74 and 72, and the slots on flanges 68 and 70 to achieve the same result. As a further alternative, each of a pair of abutting flanges can be provided with both slots and tabs, if the tabs on the respective elements extend vertically in opposite directions.

As seen in FIG. 3, elements 34, 36 and 38 of side wall 18 are interconnected in a similar manner.

Figure 4:
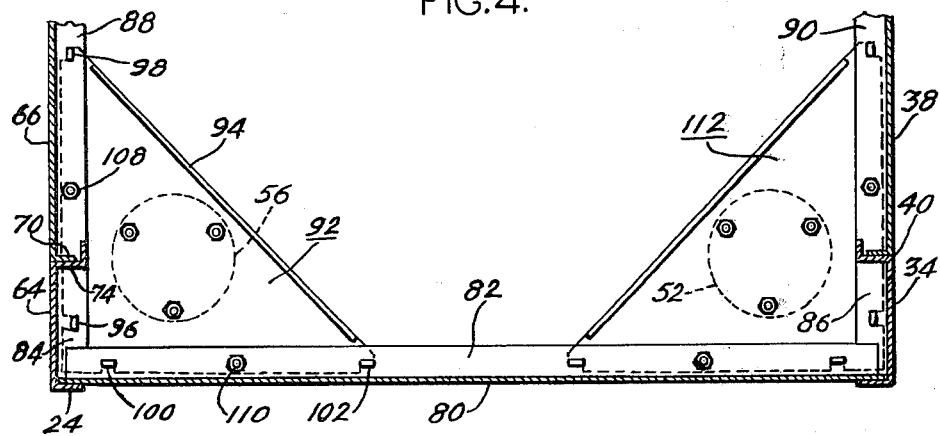
FIG. 4 is a fragmentary horizontal section taken on the plane 4—4 of FIG. 2, illustrating two of the four corner gussets at the bottom of the cabinet.

From FIG. 4, it will be apparent that rearwardly extending side wall elements 34 and 64 are integral with the vertically extending elements of the door frame 24, but that the bottom horizontal frame element 80 is welded to the vertical frame elements. Horizontal element 80 is provided with an inwardly extending horizontal flange 82, which extends substantially the full width of the cabinet at the lower edge of the front wall. The lower edges of side wall elements 64 and 34 are also provided with integral, inwardly extending flanges 84 and 86 respectively. Side wall elements 66 and 38 respectively have inwardly extending flanges 88 and 90 provided at their lower edges. Flange 82 does not overlap flanges 84 and 86, but rather all three flanges are situated in the same plane, flanges 84 and 86 being cut out at their forward ends to provide space for flange 82. When the interengaging slots and tabs of the side wall elements are properly connected together, flanges 88 and 90 are situated substantially in the same plane as flanges 82, 84 and 86.

Figure 11:
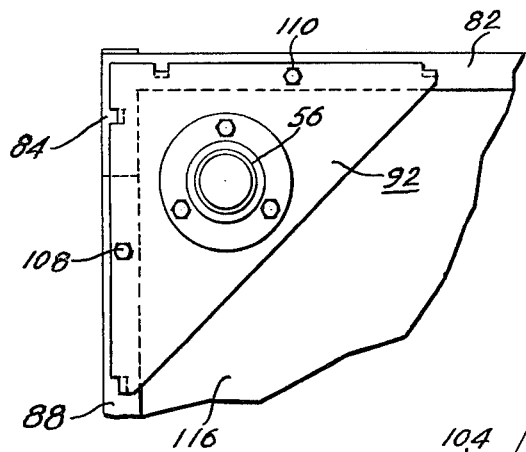
FIG. 11 is a bottom plan view illustrating a cabinet leg and corner gusset.
Figure 12:
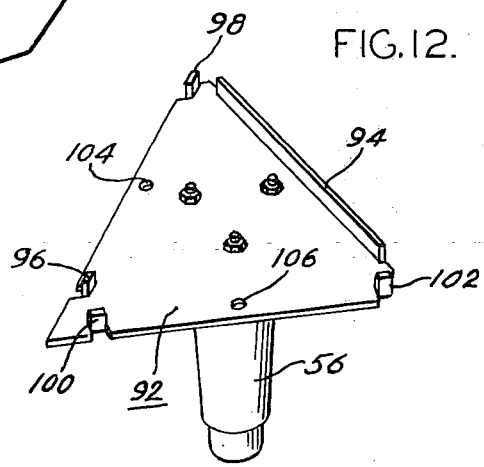
FIG. 12 is an oblique perspective view of a corner gusset with a cabinet leg attached.

FIG. 12 illustrates in detail an assembly comprising leg 56 and a triangular gusset 92. The leg is attached to the underside of gusset 92 by means of bolts, the bolts extending through a flange provided at the upper end of the leg as shown in FIG. 11. Gusset 92 is provided along one edge with a reinforcing flange 94. Integral, upwardly extending tabs 96 and 98 are provided along one of the remaining edges of the gusset, and similar upwardly extending tabs 100 and 102 are provided at the other of the remaining edges. The latter edges are also provided respectively with bolt holes 104 and 106.

When the gusset is in place, as illustrated in FIGS. 4 and 11, tab 98, which is rectangular in its configuration extends upwardly through a conforming rectangular opening in flange 88 of side wall element 66. Tab 96 extends upwardly through a similar opening in flange 84 of side wall element 64, and tabs 100 and 102 extend upwardly through rectangular openings in flange 82 of the front wall. The openings through which these tabs extend are preferably made to conform closely to the size of the tabs so that the gusset can serve effectively as a brace for the left front corner of the cabinet. Gusset plate 92 is secured to flange 88 by bolt 108 and to flange 82 by bolt 110.

As will be apparent from FIG. 4, gusset plate 112 is secured to flanges 82, 86 and 90 in a similar manner. Similar gussets are provided at the rear corners of the cabinet, and are secured respectively to flanges 88 and 90 of side wall members 66 and 38, and to an inwardly extending flange 114 (FIG. 3) at the lower edge of rear wall 58, flange 114 being similar to flange 82 at the lower edge of the front wall.

From the foregoing, it will be apparent that the four gusset plates serve three functions simultaneously: they reinforce the corners of the cabinet; they secure the cabinet to the legs; and, most importantly, they lock the side wall elements against relative vertical movement, thereby preventing the tabs and slots on the abutting flanges of the side wall elements from becoming disengaged. The structure just described is highly advantageous from the standpoint of strength and lightness in weight. It is also highly advantageous from the standpoint of simplicity, in that it requires a relatively small number of parts. Another significant advantage of the structure, arising by reason of the manner in which the wall elements are secured together, is the pleasing esthetic appearance of the cabinet, and the absence of fasteners visible from the exterior of the cabinet.

Figure 2:
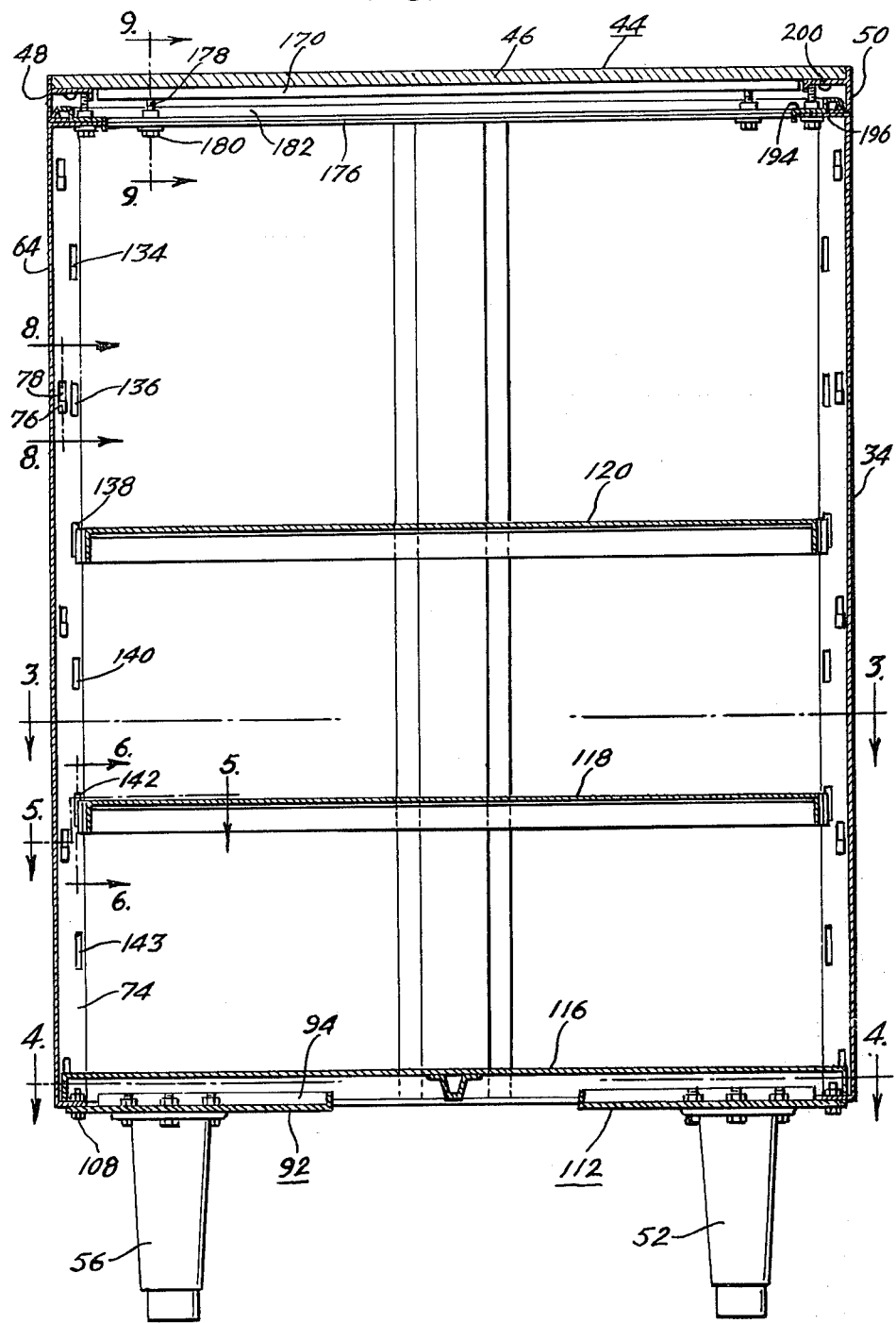
FIG. 2 is a vertical section taken on the plane 2—2 of FIG. 1.

The shelving in the cabinet, as seen in FIG. 2 comprises a floor 116, which rests on the inwardly extending flanges at the bottom of the cabinet, and a series of removable shelves comprising shelves 118 and 120. As shown in FIG. 3, floor plate 116 is provided with slots 122, 124, 126 and 128 along its sides to clear the abutting flanges of the side wall elements.

As shown in FIG. 5, flange 72 of side wall element 60 extends inwardly beyond the vertical edge of flange 68, and is bent rearwardly at 130 for reinforcement. In a similar manner, flange 74 of side wall element 64 extends inwardly beyond the vertical edge of flange 70, and is bent rearwardly at 132. The corresponding flanges on the opposite side wall are similarly configured, as shown in FIG. 3. Shelf-supporting slots are provided in the inwardly extending portions of flanges 72 and 74 which extend beyond flanges 68 and 70. Shelf-supporting slots in flange 74 are indicated in FIG. 2 at 134, 136, 138, 140, 142 and 143. These slots are arranged in a vertical row along flange 74. Corresponding slots are provided in flange 72, and in the flanges on the opposite side wall corresponding to flanges 72 and 74.

Figure 6:
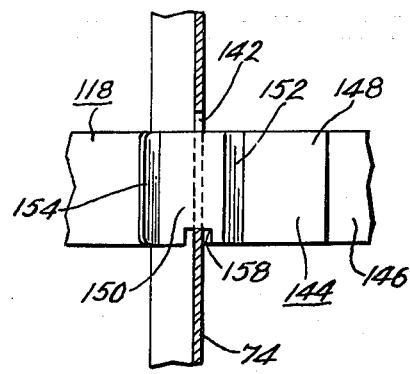
FIG. 6 is a vertical section on the plane 6—6 of FIG. 2, further illustrating the manner in which a removable shelf is supported in the cabinet.
Figure 7:
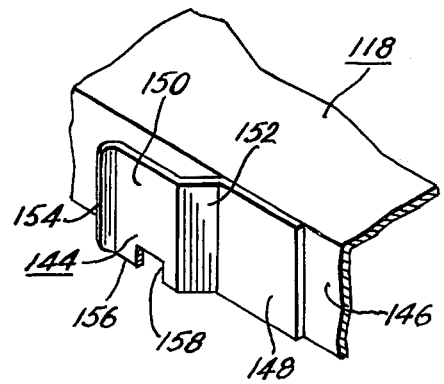
FIG. 7 is a fragmentary oblique perspective showing the details of a supporting tab at the edge of a shelf.

As shown in FIG. 7, a shelf support hook 144 is spotwelded or otherwise suitably secured to a depending flange 146 along the left-hand edge of shelf 118. Shelf support hook 144 is made from sheet metal, and comprises a first part 148, which is in engagement with flange 146 and a second part 140 which is integrally connected with part 148 by a bent portion 152. For the most part, part 150 extends rearwardly from bent part 152 in a direction parallel to flange 146, and is spaced from flange 146 by a short distance. Desirably, part 150 is provided with an outwardly extending camming element 154 to facilitate entry of element 150 into the shelf-supporting slots. Lower edge 156 of part 152 is slotted at 158 so that it provides what is in effect a hook adapted to engage a shelf-supporting slot in the manner illustrated in FIG. 6, in which slot 158 of hook 144 is shown in engagement with the lower edge of slot 142 of flange 74.

As shown in FIG. 3, each of the side edges of each shelf is provided with two rearwardly extending hooks similar to hook 144, the hooks on each side being spaced from each other by a distance equal to the spacing between the shelf-supporting flanges. Thus, the shelves can be easily removed and repositioned or replaced within the cabinet.

From the foregoing, it will be apparent that another advantage arising from the manner in which the wall elements are secured together is that the shelves are supported on the same wall element flanges which serve to secure the wall elements together. The shelf-supporting flanges, which extend inwardly from the side walls of the cabinet can be used not only to support stationary shelves, as shown, but can also be used to support guides for specialized shelves such as sliding shelves, drawers and the like. Tilted shelves for gravity feed of cigarette packs and similar articles can also be supported in the cabinet, with the rear hooks of the shelves located in slots higher than those in which the front hooks are located. While it is preferred that the shelf-supporting slots be in the flanges of the side wall elements which extend rearwardly from the front wall and forwardly from the rear wall, the shelf-supporting slots can be formed alternatively in the flanges of the main side wall elements 38 and 66, or they can be formed in both flanges of an abutting pair if desired, though the latter modification may give rise to problems in the alignment of slots.

The cabinet is readily assembled by arranging front wall 16 and rear wall 58 in the desired relationship, engaging side walls 18 and 62 with the front and rear walls by moving the tabs of the side walls horizontally into the slots of the front and rear walls, and subsequently pushing the side walls downwardly to engage the tabs with the slots. The gussets are then installed at the corners of the cabinet, the counter top is secured at the top of the cabinet, and the shelves are then installed in the desired positions within the cabinet. The entire assembly procedure can be accomplished in a very short time because of the simplicity of the structure, the small number of parts, and the relatively small number of fasteners required.

Various elements of the cabinet such as the side walls, the gussets, the legs, and certain other items can be used as standard elements for cabinets of various widths. These elements can be manufactured in large quantities and stored for use in the assembly of cabinets of various types and sizes. Thus, the needs of a particular customers can be filled in a short period of time by specially manufacturing certain parts such as the front wall assembly and the doors, and combining these special parts with the standard components to produce a complete cabinet.

The cabinet wall structure in particular lends itself to shipment in a knock-down condition in a package of relatively small size, since the U-shaped front and rear wall members can be brought together to form a pocket, and the side wall members, having at lesser width than the front and rear wall members, can be positioned in the pocket along with various other parts of the assembly to product a relatively dense package which can be shipped at low costs.

Figure 9:
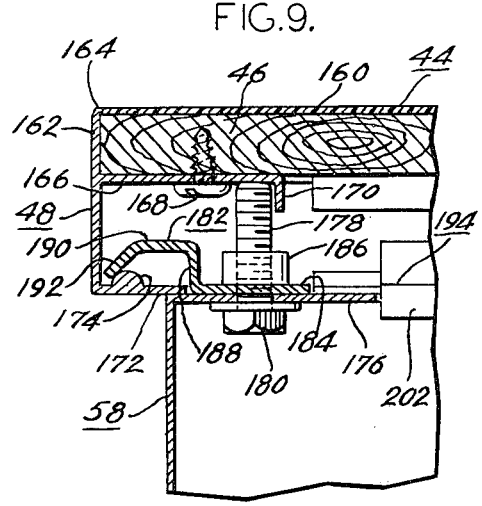
FIG. 9 is a vertical section taken on the plane 9—9 of FIG. 2, illustrating the manner in which a counter top is secured to the cabinet at the top of the rear wall.
Figure 10:
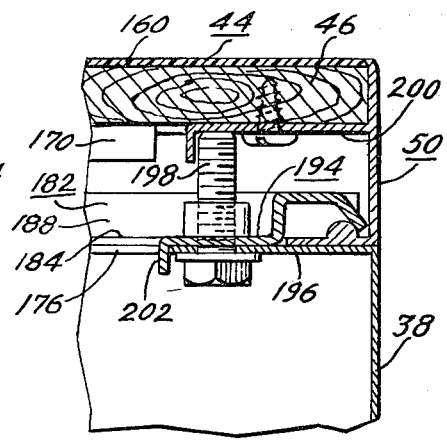
FIG. 10 is a vertical section illustrating the manner in which the same counter top is secured to the cabinet at the upper edge of a side wall.

Turning to the manner in which the counter top is secured to the upper edges of the cabinet walls, FIGS. 9 and 10 show one version of a counter top comprising a particle board 46 having a vinyl covering 160. Vinyl-covered particle boards of this type are well-known in the art, and are in common use as table tops, counter tops and the like. The particle board is provided with extruded aluminum trim elements 48 and 50. As shown in FIG. 9, which illustrates the rear edge of the counter top, trim element 48 comprises a vertical section 162, the upper edge 164 of which is aligned with vinyl covering 160. A horizontal element 166 extends inwardly in a perpendicular direction from vertical element 162, and is located at a distance below upper edge 164 equal to the thickness of the vinyl-covered particle board. Element 166 is in engagement with the underside of the particle board, and provides a supporting surface. The particle board is secured to element 166 by a series of screws, one of which is indicated at 168. Element 166 also has a depending flange 170, spaced inwardly from, and extending in parallel relation to, vertical trim element 162.

At the lower edge of vertical trim element 162, there is provided an inwardly extending flange 172, which has a hump 174 on its upper surface. Hump 174 extends substantially the full length of the trim element in a direction parallel to the length of the trim element, and is spaced a short distance inwardly from vertical section 162.

As the trim elements 48 and 50 are U-shaped, as indicated in FIG. 1, it will be apparent that they are formed by extrusion as straight elements, and subsequently bent into the U-shape as shown. In order to accomplish the bending, wedge-shaped sections are cut out of elements 166 and 172 at the corners where bending takes place.

All of the upper edges of the wall elements of the cabinet have inwardly extending flanges. The flange for rear wall 58 is indicated at 176. A bolt 178 extends upwardly through a hole in flange 176, and the end of the bolt opposite its head 180 engages the underside of horizontal trim element 166. A sheet metal clamping strip 182 comprises a horizontal section 184, which rests on the upper surface of flange 176. A threaded insert 186, which is secured in a hole in section 184 by peening, receives bolt 178, and the threads of the bolt, in cooperation with the internal threads of insert 186, secure section 184 of the clamping strip tightly against flange 176. Clamping strip 182 includes a vertically extending section 188, an outward horizontally extending section 190, and a sloping end section 192, the latter being positioned to engage hump 174. By virtue of the engagement between sloping section 192 and hump 174, the clamping strips acts as a hold-down device for trim element 48, thereby preventing the counter top from being lifted away from the cabinet.

As indicated in FIG. 2, the clamping strip extends substantially the entire width of the cabinet, and is secured to the flange of the rear wall of the cabinet by two bolts, one bolt being bolt 178. Of course, any desired number of bolts can be used.

As will be apparent from FIG. 9, the counter top overhangs wall 58 by a short distance, and trim flange 172 extends inwardly from vertical trim element 162 to a location just beyond the upper edge of wall 158. The presence of flange 172 facilitates cleaning of the cabinet by preventing the existence of a crevice in which dirt can accumulate.

The length of bolt 178 is related to the dimensions of the trim and of the clamping strip so that, when the bolt is tightened in threaded insert 186 and clamping strip is held tightly against flange 176, the end of the bolt opposite the head presses upwardly against the underside of trim element 166 and urges hump 174 of trim element 172 upwardly against the sloping clamp section 192. Preferably, the length of bolt 178 is such that, when it is tightened, it causes flange 176 of the cabinet wall to be pushed downwardly through a short distance, so that flange 176 is in tension. Bolt 178, and its corresponding bolts elsewhere underneath the counter top, support substantially the entire weight of the top and the articles on it. Clamping strip 182, and corresponding clamping strips along the other three edges of the cabinet serve to hold the counter top down. As a result of the arrangement shown in FIG. 9, it will be apparent that one of the principal advantages of the hold-down arrangement is that it securely fastens the counter top to the cabinet in a relatively simple manner despite the fact that the counter top overhangs the wall of the cabinet by a considerable distance. Because clamping strip 182 is used, there is no need to rely upon the entire width of flange 172 of the extrusion as a means for holding down the top. Furthermore, since the top rests on bolt 178 and the other bolts which correspond to it, it is unnecessary to make special provisions in the cabinet wall structure for supporting the underside of the top. By using bolts of the proper length, the bolts themselves can be used as the counter top supporting elements.

Another advantage which arises by virtue of the fact that the top rests upon the ends of the bolts is that downward forces on the top, which would normally tend to loosen the hold-down clamp, act through the bolt, and press downwardly on support flange 176. Since hump 174 is pulled up against clamp section 192 by the bolt itself, downward forces acting on the counter top do not tend to loosen the engagement between the clamp and the trim element.

Another advantage of the hold-down arrangement is that the bolts themselves are held tightly against trim element 166 by the tension in flange 176. This reduces the likelihood of any of the bolts working loose by reason of vibration.

Finally, when the hold-down arrangement is used with an overhanging top comprising a metal-trimmed particle board, the hold-down arrangement has the advantage that it prevents downward forces acting on the counter top from causing the trim to pull away from the particle board. The manner in which this is achieved will be appreciated by observing that if bolt 178 was a short bolt, and merely secured clamp 182 to flange 176, and the top were supported by the engagement of trim element 172 with the upper edge of wall 58, downward forces acting on the top would produce a pivoting action at the upper edge of wall 58 which would tend to pull trim element 48 away from particle board 46. Screws such as screw 168 could not be relied upon to prevent this from occurring, as most particle boards are sufficiently soft that screws can be pulled out of them easily. Since the support for the trim is provided by the end of bolt 178 rather than directly by the upper edge of wall 58, the pivoting action which would tend to pull the trim away from the particle board does not take place. Further assurance against such pivoting action is provided by flange 170, which is preferably positioned so that it is engaged by the side of bolt 178 when the bolt is tightened in threaded insert 186. Flange 170 provides positive assurance against pivoting of the trim. Furthermore, as the bolt is tightened, and flange 176 is pressed downwardly, the upper end of bolt 178 moves to the right against flange 170, thereby locking the vertical trim element 162 against the edge of particle board 46. This not only prevents separation of the trim from the particle board, but also locks the counter top against horizontal movement to the left. When all of the bolts corresponding to bolt 178 are tightened, the counter top is securely locked against horizontal movement.

The metal-trimmed vinyl-covered particle board top overhangs the front of the cabinet, and is secured to the upper of the front of the cabinet in a manner similar to the manner in which it is secured to the upper edge of the rear wall of the cabinet, as shown in FIG. 9.

Along the sides of the cabinet, the trim is flush with the cabinet walls as shown in FIG. 10. However, the counter top is secured to the cabinet along the upper edges of the side walls in a manner similar to the manner in which it is secured at the front and rear walls. A clamping strip 194 is secured to flange 196 of wall 38 by a bolt 198, the upper end of which presses upwardly against horizontal element 200 of the trim. A depending flange 202 of clamping strip 194 is positioned against the inner edge of wall flange 196, and insures the flush relationship between trim 50 and cabinet wall element 38. A similar hold-down arrangement is provided on the opposite side of the cabinet. The clamping strips along the side walls are secured to the side wall flanges by bolts which are located midway between the front and rear walls of the cabinet, a single bolt being provided at each side. The side wall clamping strips, including strip 194 and its corresponding clamping strip on the other side, do not extend the full depth of the cabinet, but rather provide clearance for the front and rear clamping strips.

Although there is no overhang along the side walls, and no tendency of the trim to separate from the particle board, the clamping arrangement at the upper edges of the side walls serve to prevent loosening of the engagement between the clamp and the trim, and loosening of the bolts in the same manner as described above with reference to FIG. 9.

Figure 13:
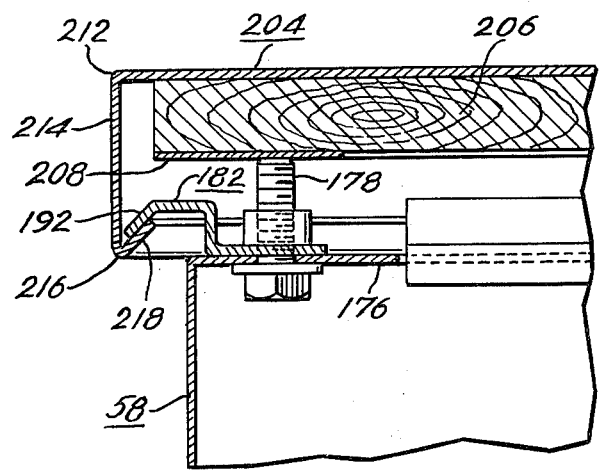
FIG. 13 is a vertical section illustrating the manner in which an alternative version of the counter top is secured to the cabinet along the top edge of the rear of the cabinet.
Figure 14:
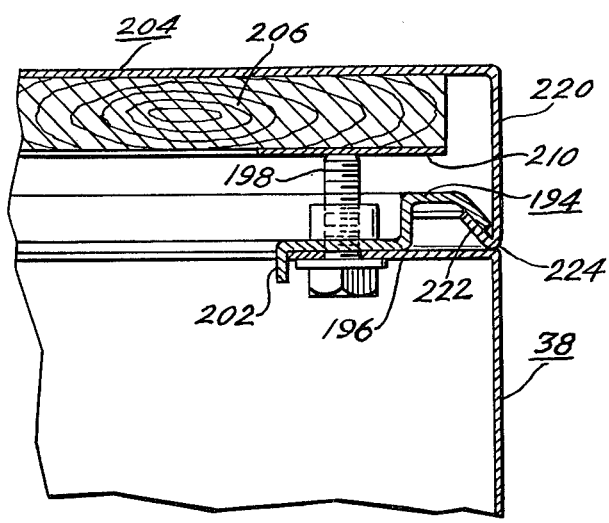
FIG. 14 is a vertical section illustrating the manner in which the same counter top is secured to the cabinet along the top edge of a side of the cabinet.

FIGS. 13 and 14 show an alternative counter top comprising a unitary sheet of stainless steel 204 having a particle board 206 secured to its underside. Underneath the particle board, around the periphery thereof, stainless steel strips are provided, one such strip being indicated in FIG. 13 at 208, and another such strip being indicated at 210 in FIG. 14.

As shown in FIG. 13, the stainless steel top 204 is bent at edge 212 to provide a downwardly extending flange 214, and another bend is provided at 216 at the lower edge of the flange to provide an inwardly and upwardly extending flange 218. The stainless steel top is similarly bent along all four edges.

The angle of flange 218 is desirably such as to conform with the angle of sloping clamp section 192. Strip 208 rests on the upper end of bolt 178. Bolt 178 and its corresponding bolts provide the load-bearing support for the counter top. The engagement between flange 218 and clamp section 192 holds the top down against the bolts. The hold-down arrangement of FIG. 13 functions in a manner similar to the arrangement of FIG. 9, in that it provides a secure interconnection between the top and the cabinet walls despite the overhanging relationship between the top and the front and rear walls of the cabinet. Again, the fact that the load on the top is transferred to the inwardly extending wall flanges through the bolts minimizes the likelihood of separation between the clamp and the inwardly and upwardly extending flanges corresponding to flange 218. Also, since the bolt bears upwardly against strip 208, assurance is provided against loosening of the bolt as a result of vibration.

In FIG. 14, the hold-down arrangement is similar to that in FIG. 10. Top flange 220 is flush with side wall element 38, and the flush relationship is maintained by the engagement of depending flange 202 of clamp 194 with the inner edge of wall flange 196. Because of the acute angle between vertical top flange 220 and sloping flange 222, the engagement of bend 224 with the upper edge of side wall element 38 cannot be depended upon to support the counter top on wall element 38. Thus, in FIG. 14, the engagement of strip 210 with the upper end of bolt 198 is as important to the support of the counter top as it would be if the top overhung the side walls of the cabinet.

The hold-down arrangements illustrated in FIGS. 9, 10, 13 and 14 are, of course applicable to the securing of counter tops to various supports other than cabinets. Further, these hold-down arrangements are applicable to various forms of counter tops other than those specifically illustrated, including counter tops having washbasins, counter tops having condiment bins, and various other forms of tops. Numerous other modifications may be made to the furniture described herein without departing from the scope of the invention as defined in the following claims.

I claim:

1. A sheet metal cabinet having four vertical walls comprising a front wall, two side walls extending perpendicularly from the front wall in the rearward direction, and a rear wall extending from one side wall to the other side wall in perpendicular relation to the side walls and spaced rearwardly from the front wall, the intersections of adjacent walls forming corners of the cabinet and each wall having a pair of vertical edges located at corners of the cabinet, said walls comprising a first sheet metal element forming at least part of the front wall and having integral, rearwardly extending side portions extending perpendicularly from the opposite vertical edges of the front wall, each rearwardly extending side portion forming a part of a side wall of the cabinet; a second sheet metal element forming at least part of the rear wall and having integral, forwardly extending side portions extending perpendicularly from the opposite vertical edges of the rear wall, each forwardly extending side portion forming a part of a side wall of the cabinet; a third sheet metal element forming part of a side wall of the cabinet and extending from one side portion of the first element to the side portion of the second element on the same side of the cabinet, said third element meeting the side portions between which it extends along vertical lines, a fourth sheet metal element forming part of a side wall of the cabinet and extending from the other side portion of the first element to the side portion of the second element at the same side of the cabinet, said fourth sheet metal element meeting the side portions between which it extends along vertical lines; each of said side portions having an integral flange extending inwardly in a vertical plane perpendicular to the side walls, and located adjacent the vertical lines at which it meets an edge of said third and fourth elements; each of said third and fourth elements having integral flanges extending inwardly in vertical planes perpendicular to the side walls and located adjacent the vertical line at which it meets the side portion of the first and second element, the flanges of the element meeting at said vertical lines being in abutment and being secured together by connecting means comprising a series of interengaging slots and tabs, the tabs on any given flange extending vertically in the same direction whereby connection of the abutting flanges is accomplished by horizontal movement of the tabs into the slots followed by relative vertical movement of the abutting elements.

2. A cabinet according to claim 1 having means for locking said first, second, third and fourth sheet metal elements against relative vertical movement so that said slots and tabs cannot become disengaged.

3. A sheet metal cabinet having at least two vertical walls meeting in perpendicular relationship to each other at a corner, the walls comprising first and second sheet metal elements meeting each other along a vertical line and being connected together by connecting means comprising a series of interengaging slots and tabs, the tabs on any given flange extending vertically in the same direction whereby connection of the sheet metal elements is accomplished by horizontal movement of the tabs into the slots followed by relative vertical movement of the first and second elements, a leg, and gusset means secured to the leg and also secured to both sheet metal elements, the gusset means serving to secure the leg to the cabinet and also serving to lock the first and second sheet metal elements against relative vertical movement so that the slots and tabs cannot become disengaged.

4. A sheet metal cabinet according to claim 3 in which the sheet metal elements have horizontally extending flanges at their lower edges, the horizontally extending flanges being substantially at the same vertical position, and in which the gusset means is secured to the horizontally extending flanges of both sheet metal elements.

5. A sheet metal cabinet according to claim 4 in which the leg extends downwardly from the approximate level of the horizontally extending flanges and in which the gusset means is secured to the upper end of the leg at said level.

6. A sheet metal cabinet according to claim 3 in which the first sheet metal element is bent at a right angle to form the corner and constitutes part of one of the two walls and at least part of the other of the two walls, in which the second sheet metal element constitutes a part of said one of the two walls, and in which the vertical line at which the first and second sheet metal elements meet is spaced from the corner.

7. A sheet metal cabinet according to claim 3 in which the first sheet metal element is bent at a right angle to form the corner and constitutes part of one of the two walls and at least part of the other of the two walls, in which the second sheet metal element constitutes a part of said one of the two walls in which the vertical line at which the first and second sheet metal elements meet is spaced from the corner, in which the sheet metal elements have abutting flanges extending in perpendicular relationship to said one of the two walls at the location of the vertical line, and in which the interengaging slots and tabs are formed on the abutting flanges.

8. A sheet metal cabinet having four vertical walls comprising a front wall, two side walls extending perpendicularly from the front wall in the rearward direction, and a rear wall extending from one side wall to the other side wall in perpendicular relation to the side walls and spaced rearwardly from the front wall, the intersections of adjacent walls forming corners of the cabinet and each wall having a pair of vertical edges located at corners of the cabinet; said walls comprising a first sheet metal element forming at least part of the front wall and having integral, rearwardly extending side portions extending perpendicularly from the opposite vertical edges of the front wall, each rearwardly extending side portion forming a part of a side wall of the cabinet; a second sheet metal element forming at least part of the rear wall and having integral, forwardly extending side portions extending perpendicularly from the opposite vertical edges of the rear wall, each forwardly extending side portion forming a part of a side wall of the cabinet; a third sheet metal element forming part of a side wall of the cabinet and extending from one side portion of the first element to the side portion of the second element on the same side of the cabinet, said third element meeting the side portions between which it extends along vertical lines; a fourth sheet metal element forming part of a side wall of the cabinet and extending from the other side portion of the first element to the side portion of the second element at the same side of the cabinet, said fourth sheet metal element meeting the side portions between which it extends along vertical lines; each of said side portions having an integral flange extending inwardly in a vertical plane perpendicular to the side walls, and located adjacent the vertical line at which it meets an edge of said third and fourth elements; each of said third and fourth elements having integral flanges extending inwardly in vertical planes perpendicular to the side walls and located adjacent the vertical line at which it meets the side portion of the first and second element, the flanges of the elements meeting at said vertical lines being in abutment and being secured together by connecting means comprising a series of interengaging slots and tabs, the tabs on any given flange extending vertically in the same direction whereby connection of the abutting flanges is accomplished by horizontal movement of the tabs into the slots followed by relative vertical movement of the abutting elements; the lower edges of said elements having inwardly extending flanges all situated substantially in the same horizontal plane; a generally triangular sheet metal gusset plate located at each corner of the cabinet just below said horizontal plane, each gusset plate being rigidly secured to the horizontal inwardly extending flange at the lower edge of one of said third and fourth elements and also to the horizontal inwardly extending flange at the lower edge of one of said first and second elements, said gusset plates serving to lock said first, second, third and fourth sheet metal elements against relative vertical movement so that the slots and tabs cannot become disengaged; and leg means secured to and extending downwardly from each of said gusset plates, said gusset plates also serving to secure said leg means to the cabinet.

9. A sheet metal cabinet having at least two vertical walls meeting in perpendicular relationship to each other at a corner, the walls comprising a first sheet metal element bent at a right angle to form the corner, the first sheet metal element constituting part of one of the two walls and at least part of the other of the two walls, and a second sheet metal element constituting a part of said one of the two walls, the sheet metal elements meeting each other along a vertical line spaced from the corner, the sheet metal elements having abutting flanges extending in perpendicular relationship to said one of the two walls at the location of the vertical line, the flanges being connected together by connecting means comprising a series of interengaging slots and tabs, the tabs on any given flange extending vertically in the same direction whereby connection of the abutting flanges is accomplished by horizontal movement of the tabs into the slots followed by relative vertical movement of the first and second elements, at least one of said abutting flanges having a series of shelf-supporting slots and said cabinet having at least one shelf located within the cabinet, the shelf having means rigidly secured to it and projecting through one of the slots in the series of shelf-supporting slots, the last-mentioned slot and said projecting means serving as part of the support for the shelf.

10. A sheet metal cabinet according to claim 9 having a leg and gusset means secured to the leg also secured to both sheet metal elements, the gusset means serving to secure the leg to the cabinet and also serving to lock the first and second sheet metal elements against relative vertical movement so that the interengaging slots and tabs cannot become disengaged.

11. A sheet metal cabinet according to claim 9 in which a portion of one of said abutting flanges extends horizontally beyond the other and in which said series of shelf-supporting slots is formed in said portion.

12. A sheet metal cabinet having four vertical walls comprising a front wall, two side walls extending perpendicularly from the front wall in the rearward direction, and a rear wall extending from one side wall to the other side wall in perpendicular relation to the side walls and spaced rearwardly from the front wall, the intersections of adjacent walls forming corners of the cabinet and each wall having a pair of vertical edges located at corners of the cabinet, said walls comprising a first sheet metal element forming at least part of the front wall and having integral, rearwardly extending side portions extending perpendicularly from the opposite vertical edges of the front wall, each rearwardly extending side portion forming a part of a side wall of the cabinet; a second sheet metal element forming at least part of the rear wall and having integral, forwardly extending side portions extending perpendicularly from the opposite vertical edges of the rear wall, each forwardly extending side portion forming a part of a side wall of the cabinet; a third sheet metal element forming part of a side wall of the cabinet and extending from one side portion of the first element to the side portion of the second element on the same side of the cabinet, said third element meeting the side portions between which it extends along vertical lines, a fourth sheet metal element forming part of a side wall of the cabinet and extending from the other side portion of the first element to the side portion of the second element at the same side of the cabinet, said fourth sheet metal element meeting the side portions between which it extends along vertical lines; each of said side portions having an integral flange extending inwardly in a vertical plane perpendicular to the side walls, and located adjacent the vertical line at which it meets an edge of said third and fourth elements; each of said third and fourth elements having integral flanges extending inwardly in vertical planes perpendicular to the side walls and located adjacent the vertical line at which it meets the side portion of the first and second element, the flanges of the element meeting at said vertical lines being in abutment and being secured together by connecting means comprising a series of interengaging slots and tabs, the tabs on any given flange extending vertically in the same direction whereby connection of the abutting flanges is accomplished by horizontal movement of the tabs into the slots followed by relative vertical movement of the abutting elements; at least one of each pair of abutting flanges having a series of shelf-supporting slots.

13. A sheet metal cabinet according to claim 12 having at least one shelf located within the cabinet, said shelf having side edges extending in parallel relation to the side walls of the cabinet and having means rigidly secured to the shelf along its side edges for supporting the shelf in the shelf-supporting slots, each shelf having at least one such supporting means projecting through a slot in each of said series of shelf-supporting slots.

* * * * *